United States Patent [19]

Kuwako et al.

[11] 4,398,109

[45] Aug. 9, 1983

[54] ELECTRIC MOTOR

[75] Inventors: Tomohisa Kuwako, Anjo; Tosio Tanase, Gifu, both of Japan

[73] Assignee: Kabushiki Kaisha Tokai Rika Denki Seisakusho, Aichi, Japan

[21] Appl. No.: 220,724

[22] Filed: Dec. 29, 1980

[30] Foreign Application Priority Data

Dec. 29, 1979 [JP] Japan .......................... 54/181903[U]
Aug. 28, 1980 [JP] Japan .......................... 55/122619[U]

[51] Int. Cl.³ ............................................. H02K 7/06
[52] U.S. Cl. .......................................... 310/80; 310/83
[58] Field of Search ................................. 360/80, 83

[56] References Cited

U.S. PATENT DOCUMENTS

| 2,956,188 | 10/1960 | White | 310/83 X |
| 3,159,758 | 12/1964 | Hemperley, Jr. et al. | 310/83 |
| 3,435,391 | 3/1969 | Straub | 310/80 X |
| 3,984,709 | 10/1976 | Kuwako et al. | 310/40 MM |
| 4,214,180 | 7/1980 | Kuwako et al. | 310/80 |
| 4,277,706 | 7/1981 | Isaacson | 310/80 |

FOREIGN PATENT DOCUMENTS 54-85305 of 0000 Japan .

*Primary Examiner*—Donovan F. Duggan
*Attorney, Agent, or Firm*—Wenderoth, Lind & Ponack

[57] ABSTRACT

An improved electric motor having an output shaft which moves in a reciprocating rectilinear motion and in which face contact between confronting axially transverse contact surfaces of stops on the output shaft and a driving member is prevented so as to eliminate the undesirable bite or cutting-in at limit of forward and backward movements of the output shaft.

4 Claims, 11 Drawing Figures

ELECTRIC MOTOR

BACKGROUND OF THE INVENTION

The present invention generally relates to an electric motor and more particularly, to an electric motor the output shaft of which is constructed to perform a reciprocating rectilinear motion.

Normally, an electric motor has the output shaft constructed so as to be rotated. However, in recent years, there has been required an electric motor having an output shaft which performs a rectilinear motion for use in an automatic control means, particularly a rectilinear displacement in a stepless manner. Conventionally, in order to meet the requirement as described above, a rotary electric motor has been employed, with external gears and the like being provided to convert the rotary motion into the rectilinear motion, thus making the mechanism complicated and the motor itself large.

In order to overcome the disadvantages as described above, there has heretofore been proposed by the present inventors an improved electric motor of the above described type, for example, in Japanese Utility Model Application Jitsugansho No. 52-159555 (Japanese Laid Open Utility Model Publication Jikkaisho No. 54-85305), in which rotational movement of the rotor is converted inside the motor into rectilinear motion for transmission to the output shaft. By the above arrangement, the mechanism required for the rectilinear motion is simplified, with consequent reduction in the size of the electric motor.

However, the above proposed electric motor achieved forward and backward movements of the output shaft by bringing stops provided on the output shaft into contact with a threaded driving member, and had the disadvantage that, since the regulation of the movements of the output shaft was effected through face contact between stops and the threaded driving member, biting or cutting-in due to abnormally excessive contact force tended to occur between the output shaft and the threaded driving member, thus making it difficult to effect the subsequent starting of the rotor.

Meanwhile, in recent years, a higher output is has been required for an electric motor of the above-described type including a greater allowable load and greater durability along with the higher output.

SUMMARY OF THE INVENTION

Accordingly, an essential object of the present invention is to provide an improved electric motor having an output shaft constructed to perform a reciprocating rectilinear motion in which face contact at confronting contact surfaces between stops on the output shaft and a threaded driving member is prevented so as to eliminate the undesirable bite or cutting-in at the positions of termination of the forward and backward movements of the output shaft.

Another important object of the present invention is to provide an improved electric motor of the above described type in which the output shaft has a plurality of male threads, while the threaded driving member has female threads corresponding to and engageable with said male threads is provided with a set of stop portions at its opposite ends so as to correspond to another set of stop portions provided at opposite ends of said male threaded portion of the output shaft, with the number of said stop portions being respectively equal to the number of said male threads, and by increasing the number of threads and corresponding stop portions respectively, loads and impact applied to the threaded portions and stop portions are advantageously dispersed so as to improve the allowable load and the durability.

A further object of the present invention is to provide an electric motor of the above described type which has a simple construction and stable operation, is highly reliable, and can be manufactured on a large scale at low cost.

In accomplishing these and other objects according to one preferred embodiment of the present invention, there is provided an electric motor having an output shaft movable in a reciprocating rectilinear motion and comprising a motor casing, the output shaft being movably accommodated in the motor casing for the reciprocating rectilinear motion thereof and so as to be prevented from free rotation with respect to the motor casing and having an externally threaded portion on its outer periphery extending over a predetermined length, a driving member having an internally threaded portion engageable with and corresponding to the externally threaded portion of the output shaft, and a rotor member integral with the rotary member so as to be rotated by action of magnetic flux from a magnet member constituting a stator and exciting coils of the electric motor. The output shaft has first stop means provided at opposite end portions of its externally threaded portion, with corresponding second stop means being provided at opposite end portions of the driving member in such a manner that confronting surfaces of the first and second stop means are not subjected to face contact with each other during the reciprocation of the output shaft.

By the arrangement according to the present invention as described above, an improved electric motor with a reciprocating output shaft has been advantageously provided, with substantial elimination of the disadvantages inherent in the conventional arrangements of this kind.

BRIEF DESCRIPTION OF THE DRAWINGS

These and other objects and features of the present invention will become apparent from the following description of several preferred embodiment thereof taken in conjunction with, in which.

Before the description of the present invention proceeds, it is to be noted that like parts are designated by like reference numerals throughout the several views of the accompanying drawings.

DETAILED DESCRIPTION OF THE INVENTION

Figure 1:
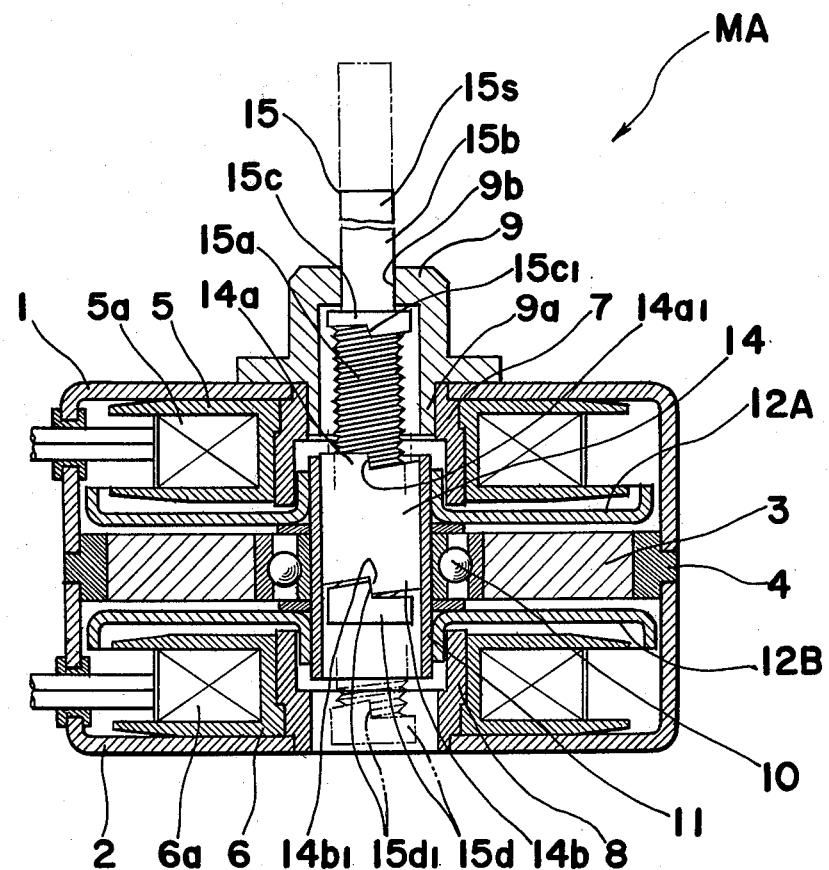
FIG. 1 is transverse sectional view of an electric motor having an output shaft thereof capable of performing a reciprocating rectilinear movement according to one preferred embodiment of the present invention.
Figure 3:
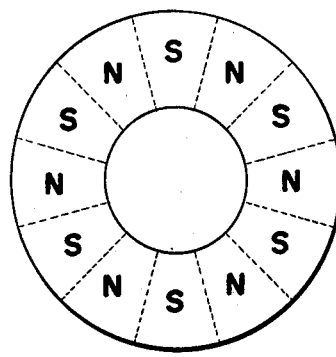
FIG. 3 is a schematic top plan view of a magnet member employed in the electric motors of FIGS. 1 and 2.

Referring now to the drawings, there is shown in FIG. 1 an electric motor MA according to one preferred embodiment of the present invention. The motor MA generally includes a first motor casing portion 1 and a second motor casing portion 2 made of soft magnetic material, between which a magnet support member 4 is held for supporting a disc-like magnet member 3 serving as a stator and magnetized so as to have alternate N and S poles as shown in FIG. 3, a first coil bobbin 5 and a second coil bobbin 6 on which exciting coils 5a and 6a are respectively wound and which are respectively mounted in the first and second motor casing portions 1 and 2 concentric with a rotor member described later, a first center yoke 7 and a second center yoke 8 made of iron material and on which the coil bobbins 5 and 6 are positioned, with a cylindrical portion 9a of a bushing 9 being fitted into the first center yoke 7, a bearing member 10 fitted having an outer ring fitted into a central opening in the magent member 3 and having a cylindrical rotor shaft 11 fitted into an inner ring of the bearing member 10, and a first rotor 12A and a second rotor 12B of pure or soft iron material having a configuration as shown in FIG. 4 and fixedly mounted on opposite end portions of the rotor shaft 11 for rotation together with said rotor shaft 11 in spaces between the magnet member 3 and coil bobbins 5 and 6 respectively.

Figure 4:
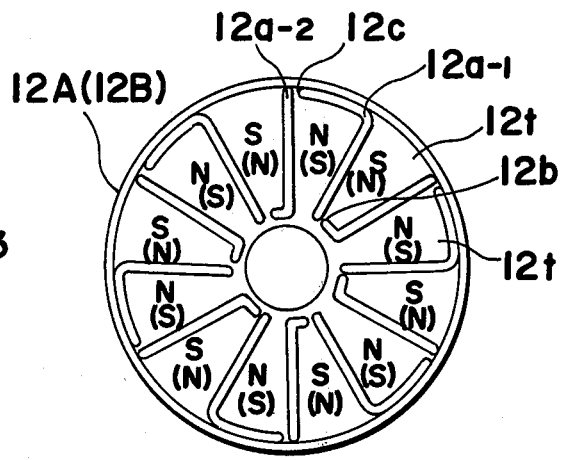
FIG. 4 is a schematic top plan view of a rotor employed in the electric motors of FIGS. 1 and 2.

The first and second rotors 12A and 12B are bent at the peripheral outer edges thereof in opposite directions, and as shown in FIG. 4, the flat portion of each of the rotors 12A and 12B is similar in shape to the other and is divided into a plurality of sections in the circumferential direction by slots 12a-1 and 12a-2 therein of generally L-shape extending radially in alternate orientations to define therebetween pole teeth 12t which correspond in number to the N and S poles of the magnet member 3 described earlier. The portions 12b and 12c between corresponding ends of the neighboring slots 12a-1 and 12a-2 are made extremely narrow yet not to such an extent that a problem is presented from the viewpoint of mechanical strength, and so that the amount of magnetic short-circuiting thereat may be neglected during magnetic saturation (i.e. so as to have a large magnetic resistance).

Figure 6:
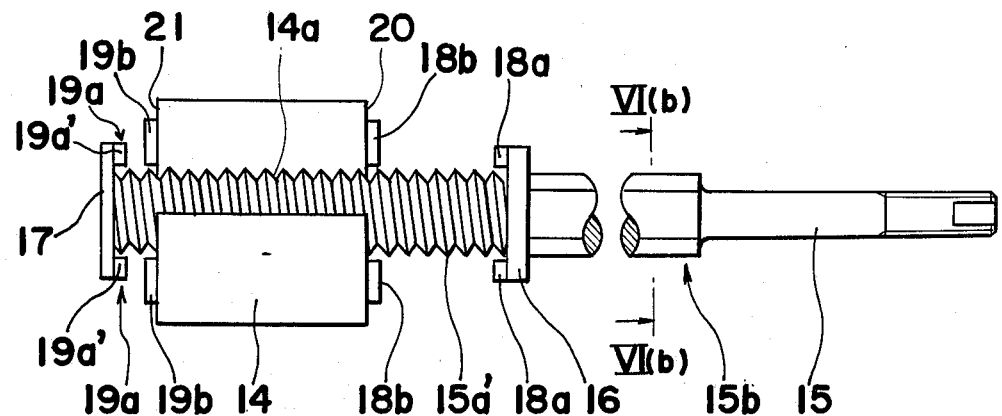
FIG. 6(a) is a schematic side elevational view showing on an enlarged scale, an output shaft and a threaded driving member employed in the electric motor of FIG. 5.
FIG. 6(b) is a cross section taken along the line VI(b)—VI(b) in FIG. 6(a), FIGS. 7(a) and 7(b) are schematic top plan views of the output shaft showing the contact of the stop portions in the maximum and minimum projecting positions of said output shaft.
Figure 6:

The electric motor MA further includes a drive member 14 in the form of a hollow cylindrical internally threaded sintered oilless bearing which is fitted into the rotor shaft 11, and an output shaft 15 having an externally threaded portion 15a formed between collar or stop portions 15c and 15d and a straight shaft portion 15s having a rotation preventing portion 15b formed by notching or flattening part of the round shaft portion 15s (FIG. 6(b)). The externally threaded portion or male thread portion 15a of the output shaft 15 is in threaded engagement with the internally threaded portion or female threaded portion of the drive member 14, with the rotation preventing portion 15b of the output shaft 15 extending through an opening 9b of corresponding configuration formed in the bushing 9. Stop portions 15c and 15d are provided at opposite ends of the male thread portion 15a of the output shaft 15 and respectively have stepped portions $15c_1$ and $15d_1$ thereon while the drive member 14 also has at its opposite ends, corresponding stop portions 14a and 14b respectively having stepped portions $14a_1$ and $14b_1$, so that the stepped portion $15c_1$ of the stop portion 15c partly contacts the stepped portion $14a_1$ of the stop portion 14a, and the stepped portion $15d_1$ partly contacts the stepped portion $14b_1$ of the stop portion 14b. More specifically, upon contact between the stepped portions $15c_1$ and $14a_1$ or between the stepped portions $15d_1$ and $14b_1$, the axially facing surfaces of the stop 15c and 14a or of the stop 15d and 14b are not subjected to face contact, and therefore, the undesirable bite or cutting-in at the stop portions during the reciprocation of the output shaft 15 is advantageously prevented.

Figure 2:
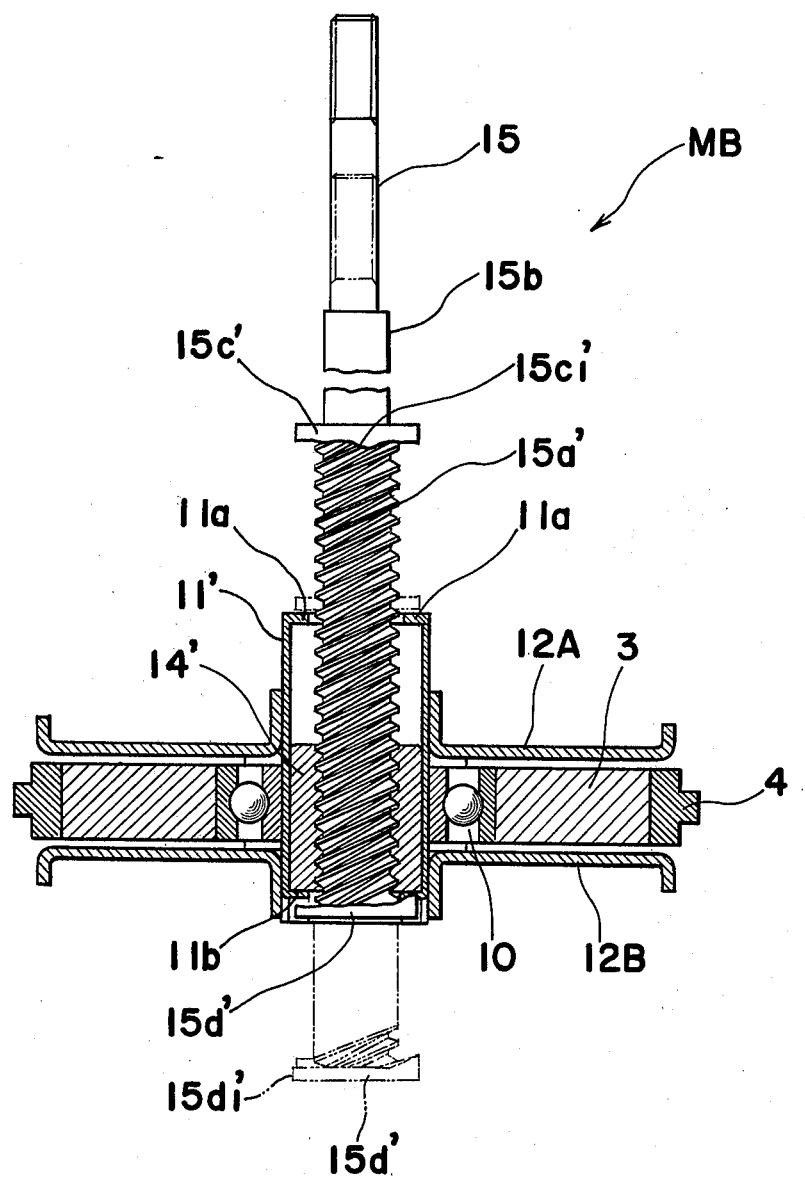
FIG. 2 is a sectional elevational view showing a main portion of an electric motor according to a modification of the present invention.

Referring to FIG. 2, there is shown a main portion of an electric motor MB which is a modification of the arrangement of FIG. 1

In the modified electric motor MB of FIG. 2, the male thread portion 15a of the output shaft 15 in the electric motor MA of FIG. 1 is replaced by a double-threaded portion 15a', and the stepped portions $15c_1$ and $15d_1$ of the stop portions 15c and 15d in FIG. 1 are modified so as to be stepped portions $15c_1'$ and $15d_1'$ provided at a pair of two positions on the stop portions 15c' and 15d' and corresponding in number to the number of threads of the threaded portion 15a', while the stop portions 14a and 14b at the opposite ends of the drive member 14 are also replaced by stop portions 11a and 11b corresponding to the stepped portions $15c_1'$ and $15d_1'$ and provided at opposite ends of the rotor shaft 11', with drive member 14' being accommodated in the rotor shaft 11' as shown. Since the remaining parts of the modified electric motor MB are generally similar to those of the electric motor MA of FIG. 1, a detailed description thereof is abbreviated here for brevity.

By the above arrangement, if the electric motor is caused to function as a pulse motor, by applying control signals (pulse signals) generated by a driving means (not shown) to the first and second exciting coils 5a and 6a, two exciting coils of the four-phase exciting coils for the first and second exciting coils 5a and 6a are always kept excited, since the mutual angles of the pole teeth of the first and second rotors 12A and 12B are spaced by electrical angles of 90° (in the present embodiment, a mechanical angle of 15° and odd multiples thereof). Accordingly, S poles or N poles are respectively induced in the magnetic teeth 12t of the first and second rotors 12A and 12B, and the rotors 12A and 12B are rotated through attraction and repulsion with respect to the magnet member 3. In the above case, since the number of poles of the rotors is twelve, the rotors advance by an angle of 360°/number of poles/two at each input signal. Namely, in the twelve-pole motor, twenty-four steps are required for the rotor to make one rotation, since one step is 15°.

By the rotation of the first and second rotors 12A and 12B in the above described manner, the drive member 14 is rotated relative to the rotor shaft 11.

On the other hand, since the output shaft 15 is not rotated due to the relationship thereof with respect to the bushing 9, the output shaft 15 can effect only vertical motion, i.e., to effect its forward or backward rectilinear motion in FIG. 1, upon rotation of the drive member 14.

When the rotors 12A and 12B are rotated clockwise, output shaft 15 advances out of the motor until the stepped portion $15d_1$ of the stop portion $15d$ comes into contact with the corresponding stepped portion $14b_1$ of the stop portion $14b$ of the drive member 14 (or until the stepped portions $15d_1'$ of the stop portion $15d'$ come into contact with the stop portions $11b$ of the rotor shaft 11 in FIG. 2) as shown in solid lines in FIG. 1 or FIG. 2.

Therefore, the rotors 12A and 12B are prevented from a further rotation, even if they tend to rotate through continued application of the pulse voltage. Even when the rotors 12A and 12B are rotated due to inertia force, the stepped portion $15d_1$ of the stop portion $15d$ on the output shaft 15 comes into partial contact with the stepped portion $14b_1$ on the stop portion $14b$ on the drive member 14 (or the stop portions $15d_1'$ come into contact with the stop portions $11b$ of the rotor shaft 11), without any face contact between the confronting end surfaces of the stop portion $15d$ and stop portion $14b$ (FIG. 1) or stop portions $11b$ (FIG. 2), and thus the undesirable bite or cutting-in between the male thread $15a$ of the output shaft 15 and the female thread of the drive member 14 is prevented, so that smooth reversing rotation of the rotors 12A and 12B can take place.

Since the reversing rotation of the rotors 12A and 12B is effected in a similar manner to that described above, the detailed description thereof is omitted here for brevity.

It should be noted here that in the foregoing embodiments, although the present invention has been mainly described with reference to a two-phase electric motor, the concept of the present invention is not limited in its application to a two-phase motor, but may readily be applied to a single phase motor as well.

Figure 5:
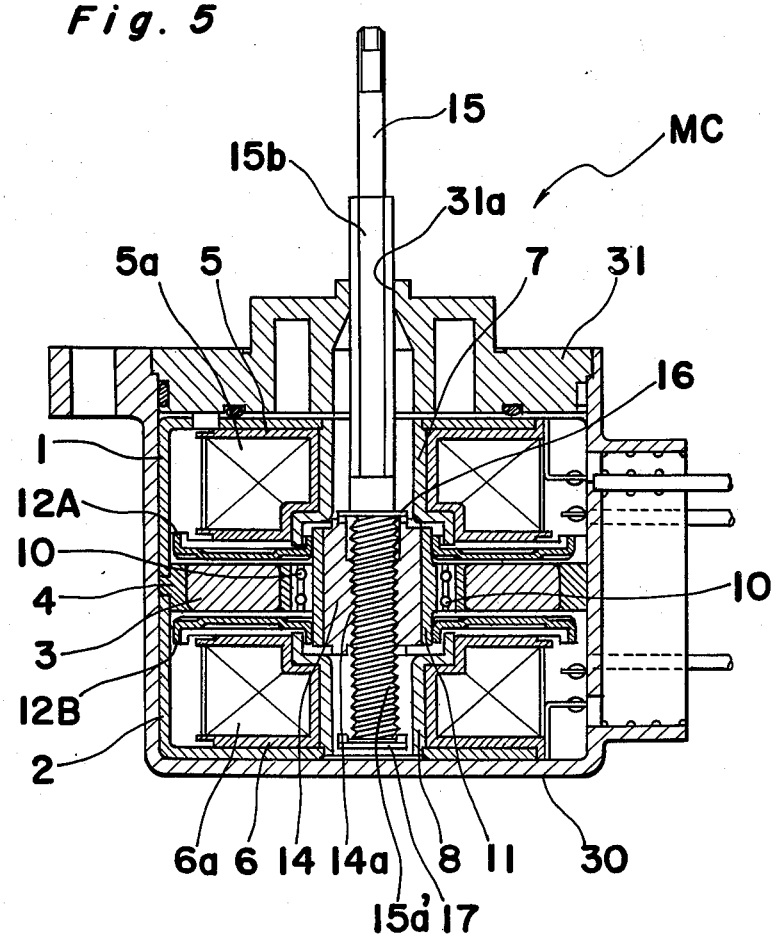
FIG. 5 is a transverse sectional view of an electric motor according to another modification of the present invention.

Referring to FIG. 5, there is shown a further modification of the electric motor MA of FIG. 1. In this modified electric motor MC of FIG. 5, the bushing 9 employed in the motor MA of FIG. 1 and having the cylindrical portion $9a$ fitted into the first center yoke 7 and the opening $9b$ for the output shaft 15 is replaced by a bushing 31 which is fitted, as a cover member, onto an outer casing 30 including therein the first and second motor casing portions 1 and 2 and which has a opening $31a$ having the same configuration as the cross section of the rotation preventing portion $15b$ of the output shaft 15 for receiving said shaft 15 therein. Moreover, the output shaft 15 has a male thread $15a'$ which is a double-threaded screw as in the embodiment of FIG. 2, and has collar portions 16 and 17 larger in diameter than that of the threaded portion $15a'$ at opposite ends of said threaded portion $15a'$. On the collar portion 16 at the end nearer to the rotation preventing portion $15b$ of the output shaft 15, there is provided a set of two stop projections $18a$ (FIG. 6($a$) and FIGS. 7($a$) and 7($b$) which are equal in number to the number of threads in the male thread $15a'$, while a similar set of two stop projections $19a$ which are equal in number to the number of threads in the male thread $15a'$ are provided also on the other collar portion 17.

The sets of stop projections $18a$ and the stop projections $19a$ are positioned such that one set thereof may be superposed on the other set in a position where said one set has been rotated through 180° around the axis of the output shaft 15, they project from the corresponding surfaces of the collar portions 16 and 17 so that they are opposed with respect to each other.

On the other hand, corresponding stop projections $18b$ and $19b$ are provided on one end face 20 of the drive member 14 and also on the other end face 21 thereof.

Figure 7A:
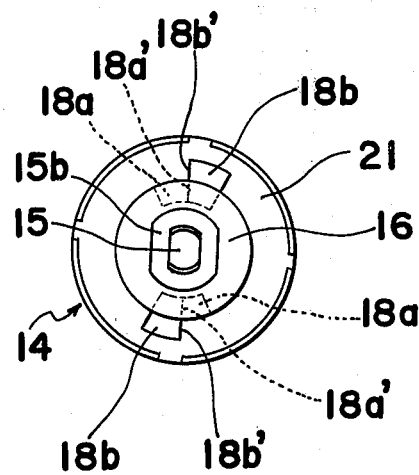
Figure 7B:
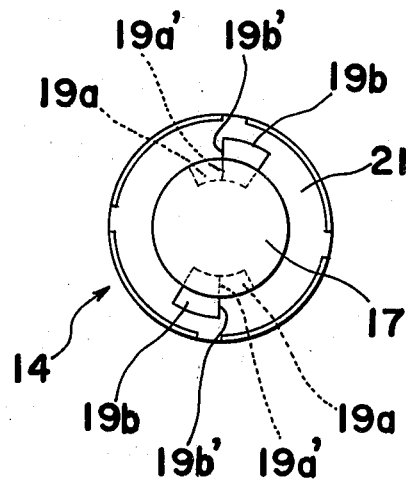

As shown in FIG. 7($a$), the above-described stop projections $18b$ are in such positions that the surfaces $18b'$ thereof projecting in the axial direction of the output shaft 15 are simultaneously engaged with the similar surfaces $18a'$ on the stop projections $18a$ on the collar portion 16.

Similarly, as shown in FIG. 7($b$), the stop projections $19b$ are formed in such positions that the surfaces $19b'$ thereof projecting in the axial direction of the output shaft 15 are simultaneously engaged respectively with the similar surfaces $19a'$ of the stop projections $19a$ on the collar portion 17.

As shown in FIG. 5, the rotation preventing portion $15b$ of the output shaft 15 is slidably inserted into the opening $31a$ in the bushing 31 for reciprocation of the output shaft 15, with the rotation of said output shaft 15 being restricted.

In the above arrangement, during the forward or backward rectilinear movements of the output shaft 15 in the manner as described with reference to FIG. 1, when the rotors 12A and 12B are rotated clockwise, the surfaces $19a'$ of the stop projections $19a$ are simultaneously engaged with the surfaces $19b'$ of the stop projections $19b$ on the drive member 14 as shown in FIG. 7($b$) so that the output shaft 15 stops its forward movement.

During the engagement as described above, since the impact force between the stop projections $19a$ and the stop projections $19b$ is dispersed between the two sets of stop projections $19a$ and stop projections $19b$ and the male thread $15a$' on the output shaft 15 is a double-threaded screw, it is seen that the load applied to the male thread $15a$ and the female thread $14a$ on the drive member 14 through the output shaft 15 is also reduced.

Furthermore, since the surfaces $19b'$ of the stop projections $19b$ on the drive member 14 are engaged with the surfaces $19a'$ of the stop projections $19a$ on the male thread $15a$ as described hereinabove, the end face 21 of the drive member 14 does not come into face contact with the confronting surface of the collar portion 17 of the male thread $15a'$. Accordingly, the undesirable bite or cutting-in between the male thread $15a'$ on the output shaft 15 and the female thread $14a$ on the drive member 14 is prevented, and thus reverse rotation of the rotors 12A and 12B may be smoothly effected.

Figure 8:
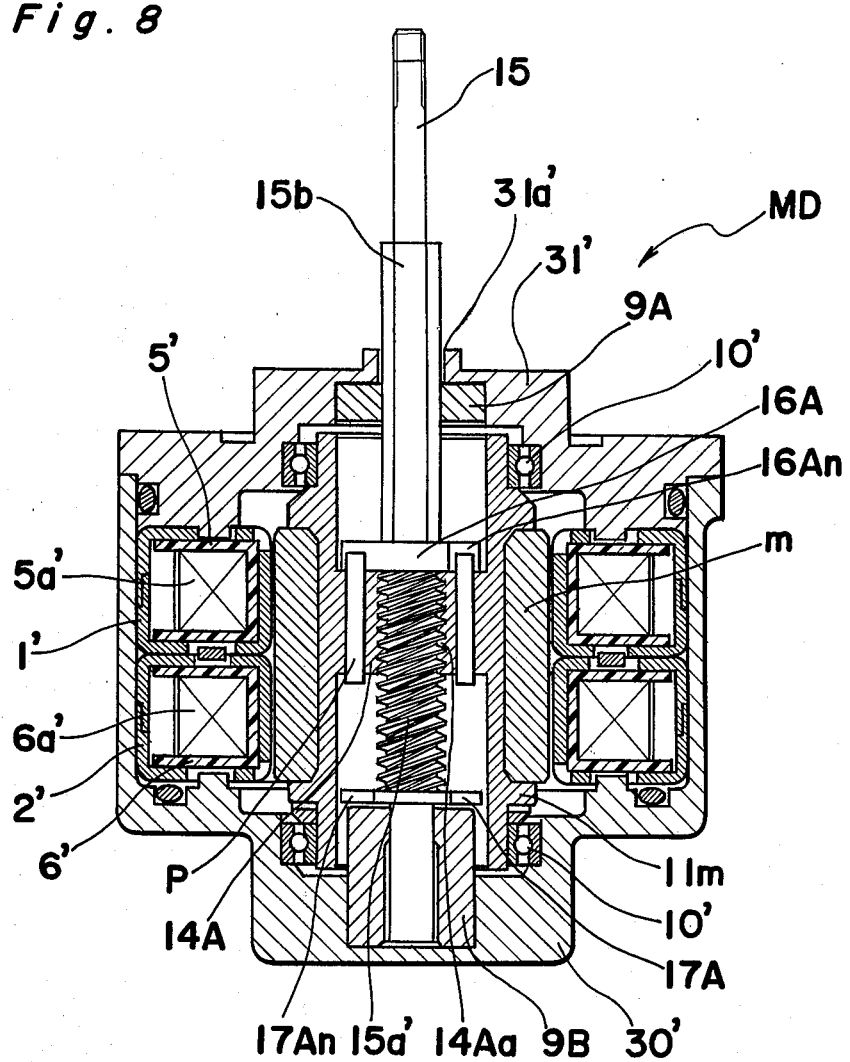
FIG. 8 is a transverse sectional view of an electric motor according to a further modification of the present invention.
Figure 9:
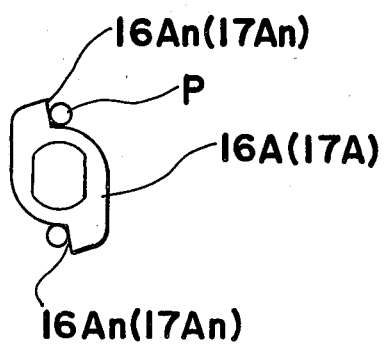
FIG. 9 is a fragmentary top plan view showing the engagement between the stop portions employed in the arrangement of FIG. 9.

It should be noted here that the the present invention is not limited to the foregoing embodiments, but may be further modified in various ways. For example, with the number of threads for the male thread $15a'$ of the output shaft 15 is n (n=2, 3, etc.), n stop portions can be correspondingly arranged at intervals of (360/n) on each of the end portions or collar portions of the male thread $15a'$, while corresponding stop portions which simultaneously engage the above stop portions on the collar portions can be provided on the opposite end faces of the drive member 14. Referring to FIG. 8, there is shown a still further modification of the electric motor MA or MC of FIG. 1 or 5. In the modified electric motor MD of FIG. 8, the magnet member 3 and the support member 4 described as employed in the arrangement of FIG. 1 or 5 are omitted, and the rotor shaft 11, and drive member 14 having the female thread 14a and stop portions described with reference to FIG. 1 or 5 are also replaced by a magnet assembly 11m having a cylindrical configuration integrally molded from a synthetic resin or the like and having a cylindrical magnet member m, for example of isotropic barium ferrite material, fitted around its outer periphery and a drive portion 14A which is coaxially positioned in the interior of the magnet assembly 11m and provided with a female thread portion 14a for engagement with the male thread 15a' on the output shaft 15 and a pair of stop pins P axially extending through said drive portion 14A, with end portions thereof projecting from the opposite ends of the drive portion 14A to a predetermined distance. The magnet assembly 11m is rotatably supported in the outer casing 30' in bearing members 10' at opposite end portions thereof through bearing members 10' for rotation with respect to the coil bobbins 5' and 6' wound with the exciting coils 5a' and 6a'. Meanwhile, the collar portions 16 and 17 on the output shaft 15 respectively having the stop projections 18a and 19a in the arrangment of FIG. 5 are replaced by stop portions 16A and 17A respectively having pairs of notches 16An and 17An in pair for engagement with the corresponding ends of the stop pins P on the drive portion 14A as shown in FIG. 9. In the arrangement of FIG. 8, the output shaft 15 is also so as to be supported at its opposite ends by bushing members 9A and 9B for the forward and backward reciprocating movements, with rotation being also restricted by the engagement of the rotation preventing portion 15b in the openings 31a' in the cover member 31' as described with reference to FIGS. 1, 2 and 5.

Since other features and functions of the electric motor MD of FIG. 8 are generally similar to those of the arrangements in FIGS. 1 and 5, a detailed description thereof is omitted here for brevity.

As is clear from the foregoing description, according to the arrangement of the present invention, since the bite or cutting-in of the drive member has been advantageously prevented, the rectilinear movement of the output shaft can be safely stopped without a need for such means as means for forced releasing from cutting-in, for example, through application of high voltage, while owing to the provision of stops on one portion of the rotary member, a certain amount of axial play of the rotary member is available at all times for efficient restarting.

Furthermore, according to the modifications of the present invention, since a plurality of threads is employed for the male thread of the output shaft, the rotation of the drive member can be stopped by the stop portions the number of which is equal to the number of the threads and respectively provided at the opposite end portions of the male thread and, the load applied to the thread portions of the output shaft and drive member and the impact force exerted on the stop portions are advantageously dispersed, and a sufficient allowable load is available, with improved durability, even when the output of the electric motor is increased to an appreciable extent.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. An electric motor comprising: a motor casing; and output shaft member movably mounted in said motor casing for reciprocating rectilinear motion in the direction of the length of said shaft member and being prevented from rotation with respect to said motor casing, said output shaft member having an externally threaded portion on the outer peripheral surface thereof having a single screw thread and extending along a predetermined length thereof; a driving member having an internally threaded portion engaged with said externally threaded portion of said output shaft member; and a rotor connected with said driving member; a magnet means and exciting coils for the electric motor positioned in said casing for rotating said rotor; said output shaft member having first stop portions at opposite end portions of the externally threaded portion thereof and each having a stepped portion with a peripherally facing stop surface, and said driving member having corresponding second stop portions at opposite end portions thereof, and each having a stepped portion with a peripherally facing stop surface engageable with said stop surface on said first stop portions, and said first and second stop portions contacting each other at said peripherally facing stop surfaces thereof for avoiding contact of the confronting surfaces of said first and second stop portions which extend perpendicular to the axis of said output shaft member.

2. An electric motor comprising: a motor casing; and output shaft member movably mounted in said motor casing for reciprocating rectilinear motion in the direction of the length of said shaft member and being prevented from rotation with respect to said motor casing, said output shaft member having an externally threaded portion on the outer peripheral surface thereof having a plurality of screw threads and extending along a predetermined length thereof; a driving member having an internally threaded portion engaged with said externally threaded portion of said output shaft member; and a rotor connected with said driving member; a magnet means and exciting coils for the electric motor positioned in said casing for rotation said rotor; said output shaft member having first stop portions at the opposite ends of said externally threaded portion and each having a plurality of projections equal in number to the number of threads on said output shaft member and extending parallel to the axis of said output shaft a predetermined distance, and said driving member having corresponding second stop portions provided at the opposite ends of said driving member and each having projections simultaneously engageable with corresponding projections on said first stop portions for dispersing the load applied to said externally threaded portion of said output shaft member and said internally threaded portion of the drive member and for dispersing the impact force exerted on said stop portions.

3. An electric motor comprising: a motor casing; and output shaft member movably mounted in said motor casing for reciprocating rectilinear motion in the direction of the length of said shaft member and being prevented from rotation with respect to said motor casing, said output shaft member having an externally threaded portion on the outer peripheral surface thereof extending along a predetermined length thereof; a driving member having an internally threaded portion engaged with said externally threaded portion of said output shaft member; and a rotor connected with said driving member; a magnet means and exciting coils for the electric motor positioned in said casing for rotating said rotor, said magnet means being a stator fixedly supported in the motor casing at a position between the exciting coils in spaced relation to said exciting coils and magnetized so as to have alternate N and S poles on its surfaces, and said rotor having a hollow rotor shaft into which said driving member is fitted and a pair of rotor disc members on said shaft having pole teeth corresponding to said N and S poles of said magnet member for being rotated in the spaces between said stator and exciting coils; said output shaft member having first stop means at opposite end portions of the externally threaded portion thereof, and said driving member having corresponding second stop means at opposite end portions thereof, the stop means on each member having contact surfaces thereon having a shape for exerting a stop force peripherally of said output shaft member and said driving member and confronting and engaging opposed faces of the stop means on the other member at the limits of the reciprocation of said output shaft member.

4. An electric motor comprising: a motor casing; and output shaft member movably mounted in said motor casing for reciprocating rectilinear motion in the direction of the length of said shaft member and being prevented from rotation with respect to said motor casing, said output shaft member having an externally threaded portion on the outer peripheral surface thereof extending along a predetermined length thereof; a driving member having an internally threaded portion engaged with said externally threaded portion of said output shaft member; and a cylindrical rotor assembly of resinous material connected with said driving member and having a driving member projecting inwardly therefrom; a magnet means and exciting coils for the electric motor positioned in said casing for rotating said rotor, said magnet being an annular magnet mounted on the outside of said rotor assembly for rotation within said motor casing, said externally threaded portion of said output shaft member having a plurality of screw threads; first stop portions at the opposite ends of said externally threaded portion and each having a number of notches therein equal to the number of said threads on said output shaft member, and second corresponding stop pins extending through said driving member parallel to said output shaft member and projecting from the opposite ends of said drive member a predetermined distance for simultaneous engagement with said notches in said first stop portions at the limits of movement of said shaft member for dispersing the load applied to said externally threaded portion of the output shaft member and said internally threaded portion of the drive member and for dispersing the impact force exerted on said stop portions and said stop pins.

* * * * *